Patented June 19, 1945

2,378,535

UNITED STATES PATENT OFFICE 2,378,535

MONOMERIC AND POLYMERIC ESTERS OF VINYL THIOLS AND PROCESS FOR THEIR MANUFACTURE

Merlin Martin Brubaker, Lindemere, Del., assignor to E. I. du Pont de Nemours & Company, Wilmington, Del., a corporation of Delaware No Drawing. Application April 21, 1939,
Serial No. 269,075

17 Claims. (Cl. 260—79)

This invention relates to synthetic resins and more particularly to a new type of vinyl resin and still more particularly to monomeric and polymeric esters of vinyl thiol.

This invention has as its object the preparation of certain new and useful compounds. Another object is the preparation of new vinyl compounds. Still another object is the preparation of certain new and useful polymers comprising these new vinyl compounds. Another object is to provide methods for the preparation of these new vinyl compounds and of polymers and interpolymers thereof. Other objects will be apparent from the reading of the following description of the invention.

These objects are accomplished by a combination of one or more of the following steps: (1) the preparation of monomeric vinyl thiol acetate either by pyrolyzing a diester of 2-mercaptoethanol, by reacting thiolacetic acid with acetylene under proper conditions, or by pyrolyzing 2-acetoxyethyl thiolacetate,

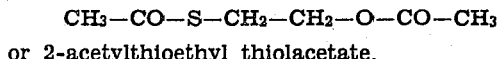

or 2-acetylthioethyl thiolacetate,

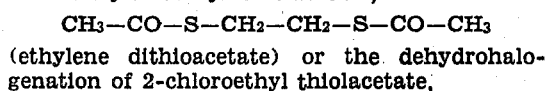

(ethylene dithioacetate) or the dehydrohalogenation of 2-chloroethyl thiolacetate,

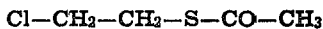

(2) the preparation of polymeric products by polymerization of vinyl thiol esters alone or in admixture with a vinyl or vinylidene compound, e. g., styrene, methyl methacrylate, vinyl acetate, etc., and (3) the preparation of polyvinyl thiol by hydrolysis of polyvinyl thiol esters and the oxidation thereof to products useful in the arts.

The following examples set forth certain well defined instances of the application of this invention. They are, however, not to be considered as limitations thereof, since many modifications may be made without departing from the spirit and scope of this invention.

Example 1

A sample of 26.6 parts of 2-acetoxyethyl thiolacetate, having a boiling point of 107° to 108° C./17 mm., was pyrolyzed at the rate of 240 grams per hour through a 6 cm. x 60 cm. glass tube packed with 12 mm. cut glass tubing and heated to 500° C. in an electric furnaces. The pyrolysis was carried out in an atmosphere of carbon dioxide to prevent oxidation of the sulfur compound. The pyrolysate was condensed, collected in a flask containing a small amount of hydroquinone, and flash distilled at atmospheric pressure making two cuts one boiling below 140° C. and the other at 140° to 220° C. The high-boiling fraction was passed through the pyrolysis tube again and distilled to separate it into two portions. The high-boiling fraction was then redistilled and 10 parts of 2-acetoxyethyl thiolacetate was recovered. The low-boiling material was washed once with salt solution and then with sodium carbonate solution until no more effervescence occurred. The oil layer was dried with anhydrous sodium sulfate and carefully fractionated. A total of 4.5 parts (43% yield) of pure vinyl thiolacetate was obtained, having the following physical properties: B. P. 121° C.; specific gravity at 25° C./4° of 1.0136; refractive index 1.4892 at 25° C.

The above experiment was repeated with analogous results using acetylthiolethyl thiolacetate.

Example 2

A mixture of 60 parts of ethylene sulfide, 122 parts of acetic anhydride, and 4 parts of pyridine was heated at 100° C. for 18.5 hours. This reaction mixture gave on distillation 134 parts of 2-acetoxyethyl thiolacetate, which corresponds to a yield of 84%. Pyrolysis of the 2-acetoxyethyl thiolacetate as described in Example 1 gave a 32% yield of vinyl thiolacetate.

Example 3

Five parts of pure vinyl thiolacetate was heated in a small flask immersed in boiling water, 0.1 part of benzoyl peroxide was added, and heating continued for about 10 minutes, at the end of which time polymerization had stopped. The polymer thus obtained, after cooling, was a clear colorless solid having a softening point of about 60° C. It was insoluble in ether and alcohols but soluble in acetone, benzene, ethyl acetate, and dioxan. The polymer was then dissolved in 100 parts of dioxan and the solution poured slowly into 100 parts of 95% ethanol. The reprecipitated polyvinyl thiolacetate thus obtained was a white solid.

Example 4

A sample of pure vinyl thiolacetate was allowed to stand at room temperature in a flask from which the air had been displaced by nitrogen. After five days a clear water-white polymer of high molecular weight was obtained.

Example 5

A sample of pure vinyl thiolacetate was polymerized without the use of catalysts by keeping the monomer at 65° C. for three days in a flask from which the air had been displaced by nitrogen. The product was a colorless hard solid.

Example 6

A sample of 5 parts of pure vinyl thiolacetate was polymerized at 0° C. using 0.1 parts of ether-boron trifluoride condensation product as the catalyst.

Example 7

A sample of pure vinyl thiolacetate was put in a glass container from which the air had been displaced by means of nitrogen, and this container exposed to a source of ultra-violet light. In about three days a colorless hard solid was obtained which had very little odor of monomer.

Example 8

A mixture consisting of 45 parts of vinyl acetate and 5 parts of vinyl thiolacetate was placed in a flask from which the air had been displaced by nitrogen, and the sample heated to 65° C. Polymerization under these conditions took place after several days. The above experiment was duplicated, except that the polymerization was carried out by exposing the sample to ultra-violet light. The product obtained under these conditions was a hard, colorless solid.

Example 9

A mixture consisting of 45 parts of methyl methacrylate and 5 parts of vinyl thiolacetate was placed in a flask from which the air had been displaced by nitrogen, and the sample heated to 65° C. Polymerization took place under these conditions requiring only a short while to give a clear colorless polymer having a hardness between 2.5 and 3, a softening point 96° C. and which was insoluble in alcohol but soluble in dioxan, benzene, toluene, and acetone.

The above experiment was repeated, except that the polymerization was carried out by exposing the sample to ultra-violet light. The polymer under these conditions was essentially similar to that described above.

Example 10

A mixture consisting of 45 parts styrene and 5 parts of vinyl thiolacetate was placed in a flask from which the air had been displaced by nitrogen and heated to 65° C. Polymerization under these conditions gave a hard colorless polymer after several days.

The above experiment was repeated, except that ultraviolet light was used as the polymerizing means with results substantially identical to those described above.

In the practice of this invention it is generally preferred to prepare the vinyl thiol esters by pyrolysis of 2-mercaptoethanol esters of mono- and dicarboxylic acids. Examples of suitable carboxylic acids are propionic, butyric, valeric, chloroacetic, lactic, benzoic, toluic, naphthoic, furoic, and quinolinic. The esters may be readily prepared by any method well known to the art, e. g., by the action of the corresponding acid, acid halide, or anhydride on 2-mercaptoethanol by standard procedures.

The best temperature for carrying out the pyrolysis depends to some extent upon the particular ester used and also upon such factors as the nature of the reaction vessel and rate of passage of the ester through the reaction vessel. Generally, temperatures in the range of 300° C. to 700° C. may be employed but it is preferred to operate in the range of 450° C. to 500° C. The process may be operated as a continuous operation, in which case the vinyl thiol is separated from the reaction product and the unconverted ester is recycled. The pressure need not be atmospheric pressure, but in the case of the higher esters it may be desirable to use reduced pressures and in the case of lower esters it may be better to use pressures greater than atmospheric. An inert atmosphere is preferred for the pyrolysis. This inert atmosphere may consist of carbon dioxide, nitrogen, or even acetic acid vapor.

The monomeric vinyl thiolester can be kept in a stabilized mixture by not carrying out the final distillation in its preparation; i. e., by keeping it in an impure state. The monomeric vinyl thiolester can also be stabilized by the addition of such agents as hydroquinone, naphthoquinone, anthraquinone, anthrahydroquinone, and copper sulfate.

The vinyl thiolacetate monomers or mixtures can be polymerized with polymerization catalysts other than benzoyl peroxide or boron trifluoride. They may be polymerized without a catalyst, or by means of a peroxide catalyst such as benzoyl peroxide, hydrogen peroxide, urea peroxide, lauryl peroxide, succinic peroxide, or by means of ultra-violet light, or by means of a metal halide catalyst such as ferric chloride, zinc chloride, copper chloride, calcium chloride, or they may be polymerized by means of sulfur dioxide. Temperatures used for polymerization may range from room temperature to 120° C.

The vinyl thiol esters of this invention may be interpolymerized with any polymerizable vinyl or vinylidene compound, by which I means a compound having the vinylidene radical $H_2C=C$ in which one of the bonds may be satisfied by anything; the other valence, however, must be satisfied by halogen, either oxygen or sulfur, or a radical containing a co-valent carbon atom which is separated from the vinylidene carbon by not more than one chain atom. Examples of suitable compounds are vinyl chloride, vinyl acetate, acrylic and methacrylic acids and their esters, e. g., methyl, ethyl, propyl, octyl, dodecyl, etc.; styrene; chloro-2-butadiene-1,3; butadiene-1,3; vinyl succinimide; vinyl phthalimide, etc. Other vinylidene compounds which may be used, however, are trimethallyl aluminate, trimethallyl borate, etc.

Polyvinyl thiolacetate and its interpolymers and mercaptals or other derivatives are useful in the coating, molding, impregnating, adhesive, and related arts. Polyvinyl thiolacetate and its interpolymers are useful for the preparation of various sulfur derivatives such as polyvinyl thiol, polyvinyl disulfide, polyvinyl mercaptols and mercaptals, polyvinyl sulfinic acid, polyvinyl sulfonic acid, and polyvinyl sulfonyl chloride.

The polyvinyl thiolacetate can be readily hydrolyzed by means of alkali as shown by the following example:

Fifteen parts of polyvinyl thiolacetate was suspended in 200 parts of 10% sodium hydroxide in methanol and this mixture allowed to stand at room temperature until the polymer went into solution. This required about three days. The resulting solution was then acidified with acetic acid to give a gelatinous precipitate which could be redissolved in alkali and reprecipitated by means of acid. The reprecipitated material was carefully washed, dried in the absence of oxygen to give an amorphous solid which was infusible, insoluble in water and all organic solvents, but soluble in alkali. Sulfur calculated for polyvinyl thiol is 53.34%; sulfur observed was 52.96%, 52.83%. The hydrolysis of vinyl thiolacetate may be carried out by other means than by the use of sodium hydroxide. Furthermore, the hydrolysis of polyvinyl thiolacetate to polyvinyl thiol is not limited to the polyvinyl thiolacetate alone. This hydrolysis may be carried out on interpolymerization products to give an interpolymer of polyvinyl thiol and another material.

Polyvinyl thiol may be oxidized by air or oxygen or other oxidizing agents as shown by the following example: Fifty parts of an alkaline methanol solution containing about 1.8 parts of polyvinyl thiol was put into a flask and oxygen bubbled into the mixture at room temperature for about 15 minutes. Gelatinous material was formed very quickly. It was filtered off, washed carefully with water, and allowed to dry. The product was infusible and insoluble in alkali. This material was presumably a polyvinyl disulfide made by the oxidation of polyvinyl thiol. Oxidation of an interpolymer containing polyvinyl thiol would give a product containing polyvinyl disulfide which would tend to make the resulting polymer insoluble.

Stronger oxidation of polyvinyl thiol, or oxidation of polyvinyl thiol derivatives, gives polyvinyl sulfonic acid, as shown by the following examples: Ten parts of polyvinyl disulfide was treated with an excess of 60% nitric acid at about 50° for two hours. After the disulfide had all dissolved, additional water was added, and the nitric acid was then removed by steam distillation in vacuum. This treatment was repeated and the product finally evaporated in a vacuum desiccator for several days. The product was a sticky, slightly yellow mass which was highly hygroscopic and insoluble in organic solvents. By using milder oxidation conditions a product was obtained which could be precipitated from a concentrated aqueous solution by the addition of alcohol. This product was an amorphous white powder which had a saponification equivalent of 857, whereas the calculated value was 108, indicating that only a small part of the sulfur had been oxidized to sulfonic acid groups in this sample. The product of the stronger oxidation was, of course, oxidized to a greater extent. In another example, 84 parts of polyvinyl thiolacetate was treated directly with 800 parts of 60% nitric acid. The reaction was fairly vigorous and the reaction mixture was cooled with ice. The reaction was over in about an hour and the mixture was then heated to 65° C. for a half hour. The excess nitric acid was removed by a steam distillation in vacuum and the polyvinyl sulfonic acid obtained as before. Strong oxidation of interpolymers containing polyvinyl mercaptan or polyvinyl thiolacetate may be used to prepare an interpolymer containing polyvinyl sulfonic acid.

Polyvinyl thiol when part of an interpolymer can be oxidized to polyvinyl disulfide, a cross-linked material which is insoluble and infusible. Interpolymers containing a high percentage of polyvinyl thiol can thus be made insoluble and infusible. Interpolymers of vinyl thiolacetate and methacrylic acid are useful as tanning agents for leather. A particularly useful interpolymer for this purpose is that prepared by interpolymerizing in toluene solution 45 parts of methacrylic acid with 10 parts of vinyl thiolacetate using 2.25 parts of benzoyl peroxide as the catalyst. Polyvinyl sulfonic acid is of value as a synthetic tanning agent for hides, gelatin, protein films, etc. The properties of the products of this invention may, if desired, be modified by incorporation of such materials as plasticizers, resins of the natural and synthetic type, cellulose esters and ethers, pigments, fillers, dyes, and the like.

It is apparent that many widely different embodiments of this invention may be made without departing from the spirit and scope thereof and therefore it is not intended to be limited except as indicated in the appended claims.

I claim:

1. The process which comprises pyrolyzing a diester of 2-mercaptoethanol so as to obtain a monomeric ester of vinyl thiol and subsequently producing a resinous polymer by the polymerization of said monomeric ester of vinyl thiol.

2. The process in accordance with claim 1 characterized in that in the step of producing a resinous polymer the monomeric ester of vinyl thiol is polymerized with a compound selected from the group consisting of vinyl compounds and vinylidene compounds.

3. As a new composition of matter a monomeric vinyl thiolester.

4. As a new composition of matter a resinous polymer of a monomeric vinyl thiolester.

5. As a new composition of matter a resinous interpolymer of a vinyl thiolester and a compound selected from the group consisting of vinyl compounds and vinylidene compounds.

6. The process for the preparation of a vinyl thiolester which comprises heating a diester of 2-mercaptoethanol to a temperature between 300° and 700° C.

7. The process in accordance with claim 6 characterized in that the reaction is carried out at a temperature between about 450° to about 500° C.

8. The process for the preparation of a vinyl thiolacetate which comprises pyrolyzing 2-acetoxyethyl-thiolacetate.

9. The process which comprises pyrolyzing 2-acetoxyethyl thiolacetate so as to obtain a monomeric vinyl thiolacetate and subsequently producing a resinous polymer by the polymerization of said monomeric ester of vinyl thiolacetate.

10. The process in accordance with claim 9 characterized in that in the step of producing a resinous polymer monomeric vinyl thiolacetate is polymerized with styrene.

11. The process in accordance with claim 9 characterized in that in the step of producing a resinous polymer monomeric vinyl thiolacetate is polymerized with methyl methacrylate.

12. The process in accordance with claim 9 characterized in that in the step of producing a resinous polymer monomeric vinyl thiolacetate is polymerized with vinyl acetate.

13. As a new composition of matter monomeric vinyl thiolacetate.

14. As a new composition of matter a resinous polymer of monomeric vinyl thiolacetate.

15. As a new composition of matter a resinous interpolymer of vinyl thiolacetate and styrene.

16. As a new composition of matter a resinous interpolymer of vinyl thiolacetate and methyl methacrylate.

17. As a new composition of matter a resinous interpolymer of vinyl thiolacetate and vinyl acetate.

MERLIN MARTIN BRUBAKER.